United States Patent
Shimamune et al.

(10) Patent No.: US 9,023,549 B2
(45) Date of Patent: May 5, 2015

(54) GAS DIFFUSION ELECTRODE

(75) Inventors: Takayuki Shimamune, Tokyo (JP); Yohannes Kiros, Solna (SE)

(73) Assignee: Permascand AB, Ljungaverk (SE)

( * ) Notice: Subject to any disclaimer, the term of this patent is extended or adjusted under 35 U.S.C. 154(b) by 91 days.

(21) Appl. No.: 13/997,737

(22) PCT Filed: Dec. 23, 2011

(86) PCT No.: PCT/EP2011/073937
§ 371 (c)(1), (2), (4) Date: Jun. 25, 2013

(87) PCT Pub. No.: WO2012/089658
PCT Pub. Date: Jul. 5, 2012

(65) Prior Publication Data
US 2013/0280625 A1  Oct. 24, 2013

Related U.S. Application Data

(60) Provisional application No. 61/427,868, filed on Dec. 29, 2010.

(30) Foreign Application Priority Data

Dec. 29, 2010 (EP) ................................... 10197276

(51) Int. Cl.
| H01M 8/14 | (2006.01) |
|---|---|
| C25B 11/04 | (2006.01) |
| C25B 11/03 | (2006.01) |
| H01M 4/86 | (2006.01) |
| H01M 4/88 | (2006.01) |
| H01M 12/06 | (2006.01) |

(52) U.S. Cl.
CPC ........... C25B 11/0489 (2013.01); C25B 11/035 (2013.01); C25B 11/0436 (2013.01); C25B 11/0473 (2013.01); H01M 4/8621 (2013.01); H01M 4/8657 (2013.01); H01M 4/8663 (2013.01); *H01M 4/8668* (2013.01); H01M 4/8807 (2013.01); H01M 4/8882 (2013.01); H01M 4/8885 (2013.01); H01M 12/06 (2013.01); Y02E 60/50 (2013.01); H01M 4/8605 (2013.01); Y02E 60/523 (2013.01)

(58) Field of Classification Search
CPC .............. C25B 11/035; C25B 11/0436; C25B 11/0473; C25B 11/0489; H01M 12/06; H01M 4/8605; H01M 4/8621; H01M 4/8657; H01M 4/8663; H01M 4/8668; H01M 4/8807; H01M 4/8882; H01M 4/8885; Y02E 60/50; Y02E 60/523

USPC ......... 429/474, 480, 484, 523, 532, 534, 209, 429/232, 237, 247
See application file for complete search history.

(56) References Cited

U.S. PATENT DOCUMENTS

| 4,370,284 | A | * | 1/1983 | Solomon | 264/42 |
|---|---|---|---|---|---|
| 4,578,159 | A | | 3/1986 | Miles et al. | 204/98 |
| 5,695,622 | A | | 12/1997 | Fraser et al. | C25B 11/04 |
| 2010/0129696 | A1 | * | 5/2010 | Hong et al. | 429/34 |

FOREIGN PATENT DOCUMENTS

| CN | 101106198 A | 1/2008 | |
|---|---|---|---|
| CN | 101326675 A | 12/2008 | |
| EP | 0 443 230 | 8/1991 | ............. H01M 4/86 |
| EP | 1 925 695 | 5/2008 | ............. C25B 11/03 |
| JP | 2004-300451 | 10/2004 | ............. C25B 11/12 |
| WO | WO 02/38833 | 5/2002 | ............. C25B 9/00 |
| WO | WO-2007/065899 A1 | 6/2007 | |

OTHER PUBLICATIONS

International Search Report for PCT/EP2011/073937 dated Mar. 26, 2012.
Written Opinion for PCT/EP2011/073937 dated Nov. 29, 2012.
International Preliminary Report on Patentability for PCT/EP2011/073937 dated Mar. 21, 2013.
Office Action dated Dec. 26, 2014 issued in Chinese Application No. 2011800597337—with English translation.

* cited by examiner

*Primary Examiner* — Patrick Ryan
*Assistant Examiner* — Ben Lewis
(74) *Attorney, Agent, or Firm* — Harness, Dickey & Pierce, P.L.C.

(57) ABSTRACT

A method of preparing a gas diffusion electrode comprising a diffusion layer, and a reaction layer arranged to each other, wherein the diffusion layer is prepared by i) admixing a) sacrificial material, b) polymer and c) a metal-based material and d) optional further components, wherein the sacrificial material has a release temperature below about 275° C. and is added in an amount from about 1 to about 25 wt % based on the total weight of components a)-d) admixed; ii) forming a diffusion layer from the admixture of step i); iii) heating the forming diffusion layer to a temperature lower than about 275° C. so as to release at least a part of said sacrificial material from the diffusion layer. A gas diffusion electrode comprising a diffusion layer and a reaction layer arranged to one another, wherein the diffusion layer has a porosity ranging from about 60 to about 95%, and an electrolytic cell comprising the electrode. An electrolytic cell, a fuel cell comprising the gas diffusion electrode and a metal-air battery comprising the gas diffusion electrode.

20 Claims, No Drawings

GAS DIFFUSION ELECTRODE

CROSS-REFERENCE TO RELATED APPLICATIONS

This application is a national stage application under 35 U.S.C. §371 of PCT International Application No. PCT/EP2011/073937 which has an International filing date of 23 Dec. 2011, and which claims the benefit under 35 U.S.C. §119 to European Application No. 10197276.8 filed 29 Dec. 2010 and U.S. Provisional Application No. 61/427,868 filed 29 Dec. 2010. The contents of each application recited above are incorporated herein by reference in their entirety.

FIELD OF THE INVENTION

The invention relates to a gas diffusion electrode and a method of producing such a gas diffusion electrode. The invention also relates to an electrolytic cell in which such gas diffusion electrode is arranged. The invention also relates to the use of such electrolytic cell, for example for production of chlorine, alkali metal hydroxide and alkali metal chlorate. The invention also regards arrangements in which such electrode is incorporated in fuel cells or as a positive electrode in secondary metal-air batteries.

BACKGROUND OF THE INVENTION

Electrolysis of alkali metal chlorides to produce chlorine and alkali metal hydroxide has been known for a long time. In the past, hydrogen evolving cathodes have been used for this purpose. The principal chemical reaction taking place in the conventional electrolytic cell can be represented by the following scheme:

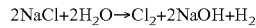

$$2NaCl + 2H_2O \rightarrow Cl_2 + 2NaOH + H_2$$

This electrolysis reaction, having a theoretical cell voltage of 2.24 V, requires a considerable amount of energy.

Previously, oxygen consuming gas diffusion electrodes have also been used for the production of chlorine and alkali metal hydroxide, as further described in e.g. U.S. Pat. No. 4,578,159. The term "gas diffusion electrode", as used herein, relates to an electrode comprising at least a diffusion layer and a reaction layer, to which gas diffusion electrode oxygen-containing reactant gas is supplied to undergo electrolysis. Electrolyte is supplied to one side of the electrode which is opposite to the side to which reactant gas is supplied. The principal total cell reaction taking place at the reaction layer of the electrode may be represented by the following scheme:

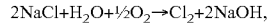

$$2NaCl + H_2O + \tfrac{1}{2}O_2 \rightarrow Cl_2 + 2NaOH,$$

the theoretical cell voltage being 0.96 V, i.e. only about 40% of the cell voltage of the cell with the hydrogen evolving electrode. The cathodic oxygen reduction $\tfrac{1}{2}O_2 + H_2O + 2e^- \rightarrow 2OH^-$ has an equilibrium potential of +0.401 V, giving rise to a total theoretical difference against the hydrogen evolving electrode of 1.23 V. Therefore, the gas diffusion electrode considerably reduces the energy costs for the operation of the electrolytic cell. The control of the diffusion, however, sometimes involves problems.

An objective of the present invention is to provide an improved gas diffusion electrode with improved control of diffusion. Also, an objective of the present invention is to improve the efficiency of the electrode including the control of hydrophobicity and electrical conductivity. A further objective of the invention is to provide an electrode imparting lowered the potential, improved stability and/or current distribution.

THE INVENTION

The present invention relates to a method of preparing a gas diffusion electrode comprising a diffusion layer, and a reaction layer arranged to each other, wherein the diffusion layer is prepared by i) admixing a) sacrificial material, b) polymer and c) a metal-based material and d) optional further components wherein the sacrificial material has a release temperature below about 275° C. and is added in an amount from about 1 to about 25 wt % based on the total weight of a)-d) admixed; ii) forming a diffusion layer from the admixture of step i); iii) heating the forming diffusion layer to a temperature lower than about 275° C. so as to release at least a part of said sacrificial material from the diffusion layer.

According to one embodiment, by the wording "arranged" in the context of arrangement of diffusion layer and reaction layer and possible further layer(s) is meant the layers are "attached", for example joined or fixed to each other. According to one embodiment, one way of arranging the layers is by means of coating one layer on another layer.

According to one embodiment, the diffusion layer and reaction layer are made from inks and/or paste. According to one embodiment, the inks and/or paste are suspended in a solution. According to one embodiment, the diffusion layer and the reaction layer are coated, rolled, and/or compacted together. According to one embodiment, the diffusion layer and reaction layer are sintered separately or together. According to one embodiment, sintering of the diffusion layer is performed, optionally in conjunction with the reaction layer, at the same time as the diffusion layer is heated in step (i), i.e. to a temperature lower than about 275° C. so as to release sacrificial material.

According to one embodiment, at least about 50 wt %, for example at least about 75 wt % or at least about 90 wt % of the sacrificial material is released from the diffusion layer. This may be controlled for example by the temperature and time during which sacrificial material is released.

By the term "release temperature" is meant the temperature at which sacrificial material can be released, for example, the temperature at which sacrificial material is decomposed or evaporated or vaporized or boiled away, dissolved out, soaked or in any other way withdrawn or released from the further components it has been admixed with. As sacrificial material is released from the diffusion layer, pores are formed in the diffusion layer.

According to one embodiment, the diffusion layer after step ii) is heated to a temperature of at least about 100° C., for example at least about 125° C. or at least about 150° C. or at least about 175° C. According to one embodiment, the diffusion layer is heated to a temperature below about 275° C., for example below about 250° C., for example below about 225° C., or below about 200° C. The term "sacrificial material" means a material which is possible to mix with components b)-d) making up the gas diffusion electrode but which is released from the prepared diffusion layer and optionally other layer(s) after the layer(s) have been heated to the release temperature of the sacrificial material. Any suitable material which can be released and mixed with the further components and has a "release temperature" below about 275° C. can be used.

According to one embodiment, the sacrificial material can be dispersed in an aqueous and/or organic medium. According to one embodiment, the sacrificial material can be suspended in an aqueous and/or organic medium.

According to one embodiment, the sacrificial material used is selected from organic and/or inorganic salts and/or acids or mixtures thereof, for example acetates such as ammonium acetate, nitrates such as ammonium nitrate, carbonates such as ammonium carbonate, and/or citrates such as ammonium citrate; inorganic salts, chloride salts such as ammonium chloride, sodium chloride and/or potassium chloride. According to one embodiment, the release temperature at which the sacrificial material is released ranges from about 100 to about 275° C., for example from about 125 to about 250° C., for example from about 150 to about 225° C., or from about 175 to about 225° C. The sacrificial materials thus have a release temperature within any of the above temperature ranges.

According to one embodiment, sacrificial material, for example alkali metal salts such as sodium chloride and potassium chloride are released by soaking the forming or formed diffusion layer with a solvent such as water.

According to one embodiment, a metal-based material comprises metal in an amount of at least 80 wt %, for example at least 95 wt % but may also contain other materials such as conductive polymers and/or non-metallic materials.

According to one embodiment, the metal-based material is a metal, for example noble metals such as silver, or silver-plated metals, e.g. silver-plated nickel or silver-plated copper or other transition metals of high conductivity such as nickel, copper; or conductive polymers or carbons or ceramics such as titanium-based or silicon-based ceramic materials, for example $TiO_2$, SiC, and/or $Si_3N_4$, for example in the form of fibers, felt and/or cloth. According to one embodiment, the diffusion layer comprises a polymer such as a hydrocarbon polymer such as vinyl resins, polyethylene, polypropylene; halocarbon polymers containing chlorine, and/or fluorine for example fluoropolymers such as polytetrafluoroethylene (PTFE), fluorinated ethylene-propylene copolymer (FEP), polychlorofluoroethylene or mixtures thereof, for example PTFE. According to one embodiment, the polymer has a molecular weight of 10,000 g/mole or more. According to one embodiment, the metal is in powder form, for example in a size ranging from about 0.01 to about 100, for example from about 0.01 to about 50 µm.

According to one embodiment, a current collector is arranged to the electrode.

According to one embodiment, the electrical conductivity of the diffusion layer is in the range from about 1 S/m to about $1 \times 10^7$ S/m, for example from about 1 to about $1 \times 10^4$ S/m. According to one embodiment, the diffusion layer thus may have the function of a current collector.

According to one embodiment, to prepare the diffusion layer, sacrificial material is mixed with metal-based material, for example a metal, and a polymer and optional further components as defined above in an amount ranging from about 1 to about 20 wt %, for example from about 5 to about 15 wt %, for example from about 5 to about 10 wt % based on the total weight of said components a)-d) admixed.

According to one embodiment, the formed diffusion layer before the heat treatment is composed of metal, polymer and sacrificial material and optional further components. The diffusion layer can be sintered by means of heating to a temperature below about 275° C. According to one embodiment, sintering is performed at a temperature lower than about 325° C., for example lower than about 300° C. or lower than about 275° C., or at such temperature that sintering and release of a sacrificial material can be performed simultaneously. Sintering can also be performed at any other suitable temperature at which the sacrificial material is released. According to one embodiment, the time of sintering ranges from about 1 minute to about 2 hours, for example from about 0.5 h to about 2 h, or from about 0.5 h to about 1.5 h. These time ranges may also be suitable for release of a sufficient amount of sacrificial material.

According to one embodiment, a mixture of reaction layer precursor material comprising catalytic material and polymer is coated on the diffusion layer, for example by means of painting, pasting, coating, or rolling. Thereafter, the coated diffusion layer can be heated and sintered at the same time to form a gas diffusion electrode.

According to one embodiment, the diffusion and reaction layers are co-pressed. In that way, the porosity of the gas diffusion electrode can be maintained intact. According to one embodiment, the reaction and diffusion layers are compressed at a pressure ranging from about 100 to about 600 kg/cm², for example from about 100 to about 300 kg/cm².

According to one embodiment, the reaction and diffusion layers are rolled together, for example to a thickness ranging from about 300 to about 1000 µm, for example from about 300 to about 800 µm, or from about 300 to about 600 µm. According to one embodiment, the thickness of the rolled reaction and diffusion layers ranges from about 500 to about 1000 µm.

According to one embodiment, in the process of preparing the diffusion layer, the polymer, for example dry PTFE; and a metal, for example silver or silver-coated metals, are mixed in a weight ratio of polymer to metal ranging from about 5:100 to about 40:100, for example from about 15:100 to about 40:100, or for example from about 15:100 to about 25:100, or from about 20:100 to about 25:100. A prepared diffusion layer with such weight ratio is thus obtained.

According to one embodiment, no backing polymer sheet, for example backing PTFE sheet is comprised in the diffusion layer in order to prevent catholyte from entering the gas compartment.

According to one embodiment, water and/or a hydrocarbon solvent is added to the components a)-d) admixed to prepare the diffusion layer. Such solvent, for example methanol, ethanol, hexane or aliphatic or aromatic hydrocarbons such as ShellSol D-70 can be mixed in a colloidal mill in conjunction with the further components a)-d) making up the diffusion layer. According to one embodiment, no further component d) is admixed with components a)-c).

According to one embodiment, the reaction layer comprises a catalyst material composed of for example transition metals; silver, gold, ruthenium, palladium, platinum or platinum group metals; alloys or binary or ternary combinations of platinum, alloys of palladium, iron, nickel, cobalt, chromium or mixtures and/or oxides thereof, for example platinum, silver or mixtures or oxides thereof. According to one embodiment, the reaction layer comprises perovskites of the type $ABO_3$, wherein A is an element from the periodic table IIA, IIIA and/or a lanthanide; B is one or several transition metals and/or mixtures thereof. According to one embodiment, the reaction layer may comprise particles in the range from about 0.01 to about 100 µm, for example from about 0.01 to about 50 µm, for example from about 0.01 to about 1 µm. According to one embodiment, the particles can be arranged as a coating on the diffusion layer. As an example, a silver reaction layer can be coated.

According to one embodiment, at least about 50%, for example at least about 75% or at least about 90% or at least about 95% of the sacrificial material is released from the reaction layer.

According to one embodiment, the reaction layer is heated, separately or in conjunction with the diffusion layer, at a temperature of at least about 100° C., for example at least about 125° C. or at least about 150° C. or at least about 175°

C. According to one embodiment, the reaction layer is heated to a temperature below about 275° C., for example below about 250° C., for example below about 225° C., or below about 200° C. If the sacrificial material has been admixed with the components b)-d), the reaction layer is rendered porous after such heat treatment.

According to one embodiment, the sacrificial material used for the reaction layer is selected from e.g. organic salts and/or acids, for example acetates such as ammonium acetate, nitrates such as ammonium nitrate, carbonates such as ammonium carbonate, citrates such as ammonium citrate; chloride salts such as ammonium chloride, sodium chloride and potassium chloride.

According to one embodiment, sacrificial material is mixed with the further components making up the reaction layer, for example metal and polymer as defined above, in an amount ranging from about 1 to about 25, for example from about 5 to about 15, for example from about 5 to about 10 wt % based on the total weight of the components admixed.

According to one embodiment, the reaction layer has a porosity ranging from about 5 to about 95, for example from about 5 to about 50%, for example from about 10 to about 40%, or from about 20 to about 40%.

According to one embodiment, the porosity in the reaction layer, i.e. the reaction layer formed after release of sacrificial material, ranges from about 30 to about 80% or from about 30 to about 75%, or from about 40 to about 70%. According to one embodiment, the porosity of the reaction layer ranges from about 60 to about 95%, for example from about 60 to about 90%, or from about 65 to about 85%.

The term "porosity" is defined by the ratio of the apparent density/theoretical density. The apparent density can be measured and calculated from the measured weight and apparent volume (calculated in turn from the dimensions thereof). The theoretical density is well known to the skilled person and can be found in e.g. well-known reference literature. The porosity is effected by the present invention by means of addition of sacrificial material to the further components making up the diffusion layer, and optionally to the components making up the reaction layer. Due to the fact that the sacrificial material subsequently is released, an increase in porosity occurs.

According to one embodiment, the pores formed in the diffusion layer and/or reaction layer have a diameter ranging from about 0.1 to about 400 µm, 10 to about 400 µm, for example from about 25 to about 300 µm, or from about 50 to about 150 µm.

According to one embodiment, the density of the reaction layer is in the range from about 2 to about 7, for example from about 2.5 to about 6.5, or from about 2.5 to about 4.5 g/cm$^3$.

According to one embodiment, a polymer functioning as binder may be included in the reaction layer, e.g. polytetrafluoroethylene (PTFE), fluorinated ethylene-propylene copolymer (FEP), fluoro polymers such as Nafion® (perfluorocarbon sulfonic acid resin) and derivatives thereof, or other halocarbon polymers such as polychlorofluoroethylene or mixtures thereof, for example polytetrafluoroethylene (PTFE) or perfluorocarbon sulfonic acid resin (Nafion®) or mixture or derivatives thereof. According to one embodiment, the polymer, for example PTFE can be used in the form of fine powder, for example with a size ranging from about 0.1 to about 100 µm, for example from about 1 to about 10 µm.

According to one embodiment, a polymer, for example PTFE, can be used with or without a surfactant. If no surfactant is used, a lower sintering temperature, for example lower than about 275° C. can be used for forming the diffusion and/or reaction layers of the gas diffusion electrode. If the temperature is below this limit, substantially no detrimental impact on the catalytic material in the reaction layer will be made.

According to one embodiment of the reaction layer, the weight ratio of polymer to catalyst material ranges from about 3:100 to about 30:100, for example from about 3:100 to about 25:100, for example from about 4:100 to about 15:100. According to one embodiment, the weight ratio of polymer to catalyst ranges from about 10:100 to about 25:100.

According to one embodiment, the thickness of the reaction layer ranges from about 10 to about 1000 µm, for example from about 20 to about 600 µm, or from about 50 to about 100 µm.

According to one embodiment, the reaction layer is prepared by mixing and pressing the components making up the reaction layer, for example by means of press-forming a catalyst material and polymer, and optionally a sacrificial material, prior to heat treatment thereof. According to one embodiment, a catalyst powder having a size ranging from about 0.01 to about 100, for example from about 0.01 to about 1.0 µm may be mixed with polymer prior to admixing catalyst powder having a size ranging from about 0.01 to about 20, for example from about 0.1 to about 10 µm therewith. As an example, silver catalyst material with this texture may be mixed with PTFE.

According to one embodiment, catalyst, for example catalyst powder, is mixed with polymer, for example PTFE, prior to press-forming or rolling preceding the heat treatment step.

According to one embodiment, the heat treatment of the reaction layer is performed in the temperature range from about 100 to about 275° C., for example from about 110 to about 220° C., for example from about 110 to about 150° C. According to one embodiment, the heat treatment is performed at a temperature from about 175 to about 275° C. This procedure can be used to apply the reaction layer to any other adjacent layer of the gas diffusion electrode such as the diffusion layer.

According to one embodiment, a substrate is arranged on the reaction layer on the opposite side of the diffusion layer.

According to one embodiment, a current collector is arranged on the diffusion layer on the opposite side of the reaction layer.

According to one embodiment, the current collector is arranged between the reaction layer and the diffusion layer. According to one embodiment, the current collector is arranged on the reaction layer on the side opposite to the diffusion layer.

According to one embodiment, the current collector is composed of a metal such as silver or silver-plated metal, such as silver-plated nickel, iron and copper, carbon or carbon fabric. According to one embodiment, the current collector is woven or is an expanded mesh. According to one embodiment, the size of the current collector ranges from about 25 to about 100 mesh.

According to one embodiment, the current collector may be a net, mesh, extended metal or other structure and may provide further mechanical support to the gas diffusion electrode.

According to one embodiment, the gas diffusion electrode comprises a hydrophilic layer. The hydrophilic layer can be arranged to the reaction layer, for example on the opposite side of the diffusion layer. The hydrophilic layer comprises a porous material resistant to electrolytes present in the cathode compartment e.g. alkaline solutions such as caustic soda or the like. Suitably, the hydrophilic layer comprises carbon such as carbon cloth, porous carbon, sintered carbon, or mixtures thereof.

According to one embodiment, a barrier layer is arranged to the reaction layer of the gas diffusion electrode. The barrier layer may be as set out in e.g. EP 1337690.

According to one embodiment, the hydrophilic layer is arranged on the barrier layer on the opposite side of the reaction layer. The hydrophilic layer can be arranged to or nearby a separator, such as an ion selective membrane, partitioning an electrolytic cell into a cathode compartment, in which the gas diffusion electrode is arranged, and an anode compartment. According to one embodiment, the catholyte can thereby be maintained between the membrane and the hydrophilic layer in a two compartment arrangement, i.e. without a separate gas compartment in the cathode compartment.

According to one embodiment, the gas diffusion electrode comprises an electrode substrate, for example a mesh. The substrate can be arranged to any layer of the gas diffusion electrode.

According to one embodiment, the substrate is arranged on the reaction layer. According to one embodiment, a substrate is arranged on the diffusion layer.

According to one embodiment, the electrode substrate may be made of silver or silver plated metals such as silver plated stainless steel, silver plated nickel, silver plated copper, gold, gold plated metals such as gold plated nickel, or gold plated copper; nickel, cobalt, cobalt plated metals such as cobalt plated copper, or mixtures thereof, for example silver or silver plated metals. Polymers such as halocarbon polymers can also be incorporated in the electrode substrate as very finely divided particulate solids, e.g. micron-sized particles.

According to one embodiment, the electrode substrate is arranged on or inside the diffusion layer. According to one embodiment, the electrode substrate is arranged on or inside the reaction layer. According to one embodiment, electrode substrates are arranged on or inside both the diffusion layer and the reaction layer, for example on both the diffusion layer and the reaction layer.

According to one embodiment, the substrate is arranged inside the diffusion layer. According to one embodiment, the thickness ratio of the substrate to the diffusion layer ranges from about 1:1 to about 1:10, for example from about 1:1 to about 1:5 or from about 1:4 to about 1:8. According to one embodiment, the substrate is arranged partly inside and partly outside the diffusion layer.

According to one embodiment, the substrate is arranged both inside the diffusion layer and the reaction layer.

According to one embodiment, the substrate is arranged partly inside the reaction layer and partly outside the reaction layer.

According to one embodiment, one or several substrates are arranged in the gas diffusion electrode. According to one embodiment, two or more substrates are arranged in the gas diffusion electrode structure, for example both in the diffusion layer and the reaction layer.

According to one embodiment, the layers of the gas diffusion electrode are arranged to each other by means of coating.

According to one embodiment, the diffusion layer and the reaction layer are arranged to the electrode substrate by means of coating.

According to one embodiment, the electrode is prepared by one or several of the following steps:
1) optionally providing a substrate, suitably by spreading a powder paste over a net or mesh, which powder paste is subsequently sintered to the net at a temperature of from about 150° C. to about 500° C., for example from about 200° C. to about 275° C.,
2) applying an electrocatalytic powder paste and/or solution on one side of the electrode substrate to form a reaction layer, and a gas diffusion layer on the opposite side thereof, or in the absence of a substrate, applying an electrocatalytic powder paste and/or solution directly on either the reaction layer or the diffusion layer. The electrocatalytic powder paste and/or solution and the optional binder solution is suitably baked at a temperature from about 70 to about 150° C.;
3) optionally applying a barrier layer to the reaction layer; and
4) optionally arranging a hydrophilic layer to the barrier layer.

According to one embodiment, the powder paste of step 1 is silver powder paste, gold powder paste, or mixtures thereof, preferably silver paste. The net or mesh, on which the powder paste is sintered, is suitably made of silver or silver plated metals such as silver plated stainless steel, silver plated nickel, silver plated copper, gold, gold plated metals such as gold plated nickel, copper, gold plated copper; nickel, cobalt, cobalt plated metals such as cobalt plated copper, or mixtures thereof, preferably silver or silver plated metals. The optionally applied binder solution of step 2 suitably is polytetrafluoroethylene (PTFE), fluoropolymers such as perfluorocarbon sulfonic acid resin (Nafion®) or derivatives thereof, which suitably comprises perfluorocarbon sulfonic acid type resin, fluorinated ethylene-propylene copolymer (FEP), or other halocarbon polymers such as polychlorofluoroethylene or mixtures thereof, preferably polytetrafluoroethylene (PTFE), or perfluorocarbon sulfonic acid resin (Nafion®). The applying of an electrocatalytic powder paste and/or solution can also be performed simultaneously with step 1 or 3. To impart good affinity avoiding direct contact between the reaction layer and the hydrophobic layer, the reaction layer is provided with a barrier layer of e.g. $ZrO_2$.

According to one embodiment, the gas diffusion electrode comprises a silver mesh substrate, a diffusion layer comprising a silver paste mixture of silver powder and PTFE sintered to the substrate; a reaction layer arranged to one side thereof comprising a catalyst of silver and/or platinum layer and/or metal oxides, on which a reaction layer, a barrier layer composed of 70 wt % $ZrO_2$ powder mixed with a 30 wt % PTFE, perfluorocarbon sulfonic acid resin (Nafion®), or mixtures thereof is arranged; and to which barrier layer a hydrophobic layer is arranged.

The invention also relates to a gas diffusion electrode obtainable by the method as defined herein.

The invention also relates to a gas diffusion electrode comprising a diffusion layer and a reaction layer arranged to one another, wherein the diffusion layer has a porosity ranging from about 60 to about 95%. One advantage obtained by the gas diffusion electrode as defined herein is the enhanced adhesiveness between the reaction and diffusion layers. As sacrificial material is released as the diffusion layer is heated to the release temperature as defined herein, the diffusion layer is rendered porous.

According to one embodiment, the diffusion layer has a porosity ranging from about 60 to about 90%, for example from about 60 to about 85% or from about 65 to about 85%.

According to one embodiment, the pores formed in the diffusion layer have a diameter ranging from about 0.1 to about 400 µm, for example from about 10 to about 400 µm, for example from about 25 to about 300 µm, or from about 50 to about 150 µm.

According to one embodiment, the density of the diffusion layer is in the range from about 2 to about 7, for example from about 2.5 to about 6.5, for example from about 2.5 to about 4.5 g/cm$^3$.

According to one embodiment, the thickness of the diffusion layer and, optionally the current collector, is in the range from about 200 to about 1000, for example from about 300 to about 900, for example from about 500 to about 600 μm. Further characteristics of the diffusion layer, the reaction layer, the current collector, the hydrophilic layer, the barrier layer and any other features of the gas diffusion electrode are as defined in the method description set out herein.

The invention further concerns an electrolytic cell comprising a separator dividing the cell into an anode and a cathode compartment, wherein the cathode compartment comprises the above described gas diffusion electrode. Any suitable anode may be employed in the anode compartment. The gas diffusion electrode may be arranged in an electrolytic cell as plural belt-shaped electrode members or in an electrode patchwork configuration, as further described in U.S. Pat. No. 5,938,901.

According to one embodiment, plural gas diffusion electrode members are arranged with a space between the electrode members in the vertical direction in the electrolytic cell.

According to one embodiment, the cell is a retrofitted conventional cell, i.e. a cell with hydrogen-evolving cathode.

According to one embodiment, the gas diffusion electrode is arranged in a three compartment cell. According to one embodiment, the gas diffusion electrode is arranged in a two compartment cell.

According to one embodiment, the separator is a commercially available ion exchange membrane, such as perfluorocarbon sulfonic acid resin (Nafion®), such as a cation exchange membrane, made of a solid polymer electrolyte that transfers ionic charge due to fixed ion exchange groups attached to the backbone chains. According to one embodiment, the membrane used is an inert, flexible membrane, substantially impervious to hydrodynamic flow of the electrolyte and the passage of gas products produced in the cell. The ion exchange membrane may comprise a perfluorinated backbone coated with attached fixed ionic groups such as sulphonic or carboxylic radicals. The terms "sulfonic" and "carboxylic" are meant to include salts of sulfonic and carboxylic acids which are suitably converted to or from the acid groups by processes such as hydrolysis. Also non-perfluorinated ion exchange membranes or anion exchange membranes comprising quaternary amines on a polymeric support may be used.

According to one embodiment, a space is also provided between electrode members in the horizontal direction. Thereby, the electrode members do not necessarily continue over the whole horizontal direction in the cell, but may be divided into plural parts in the horizontal direction. In an embodiment where the electrode members are divided in the horizontal direction, electrolyte can flow down from each space formed by the horizontal division. Thus, electrolyte can easily be released from the electrode members. The structure of plural electrode members arranged both in the horizontal direction and the vertical direction with a space in between can be described as a patchwork.

The invention further concerns a metal-air battery comprising the gas diffusion electrode as described herein.

The invention further concerns the use of the gas diffusion electrode in an electrolytic cell, for example for the production of chlorine, alkali metal hydroxide, and alkali metal chlorate. The gas diffusion electrode can be applied in both newly constructed and retrofitted or converted electrolytic cells. According to one embodiment, the gas diffusion electrode can be used for hydrochloric acid electrolysis, or metal electrowinning where the gas diffusion electrode is used as the anode. Also, the gas diffusion electrode of the invention can be used in fuel cells, for example alkaline fuel cells (AFC), direct methanol fuel cells (DMFC), direct hydrazine fuel cells (DHFC), direct borohydride fuel cells (DBHFC) as well as a positive electrode in secondary metal-air batteries, such as aluminium-air, zinc-air, iron-air, metal hydride-air and lithium-air.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it. If not otherwise specified, all percentages given herein concern percent by weight.

EXAMPLE 1

Silver powder having a particle size of 0.1 to 10 μm was mixed together with 20 to 30% by weight of fine PTFE powder and sacrificial material of ammonium carbonate together with D70 solvent. Subsequently, the solvent was removed by filtration with a membrane filter (1 μm cutoff). The thus obtained silver paste was rolled to prepare a 0.6 mm thick layer. This layer was used as precursor for a diffusion layer. The same procedure was repeated but without sacrificial material to obtain a reference.

Then a precursor of a reaction layer was prepared under similar process conditions by using a 0.01 to 1 μm-sized powder of black coloured silver and 5% by weight of PTFE and 15% by weight of ammonium carbonate. The silver powder and ammonium carbonate were mixed and suspended in D70. The thus prepared precursors of diffusion layer, reaction layer and silver woven mesh with a 0.1 mm diameter of silver wire were piled up and arranged in the following order: reaction layer (top), diffusion layer (in the middle), mesh (at the bottom). The thus obtained piled up sheets were hot pressed at 150° C. and at a pressure of 750 kg/cm$^2$ resulting in one flat plate. Subsequently, the thus obtained plate was heat treated at 200° C. for 30 min.

The thus obtained samples were measured electrochemically and their cathodic potentials read in 10 M NaOH by adding oxygen as the reaction gas. The potential was measured against Hg/HgO as reference electrode. Table 1 shows the following results:

TABLE 1

| | Electrode No | | | | | |
| --- | --- | --- | --- | --- | --- | --- |
| | 1 | 2 | 3 | 4 | 5 | 6 |
| salt (wt %) | 8 | 8 | 8 | — | — | — |
| PTFE (wt %) | 30 | 25 | 20 | 30 | 25 | 20 |
| i (kA/m$^2$) | mV | mV | mV | mV | mV | mV |
| 3.0 | −129 | −133 | −126 | −211 | −142 | −160 |
| 4.0 | −192 | −188 | −194 | −298 | −205 | −238 |
| 5.0 | −250 | −245 | −247 | −374 | −286 | −317 |
| 6.0 | −299 | −292 | −295 | −446 | −356 | −385 |
| | Invention | Invention | Invention | Ref. | Ref. | Ref. |

Note:
1) Salt used: ammonium carbonate (sacrificial material)

As can be seen from table 1, by incorporating sacrificial material into at least the diffusion layer, a far lower overpotential could be obtained for the invention compared to the reference.

EXAMPLE 2

Starting from electrode 1 of example 1, platinum paint was applied on the reaction layer thereof and heat treated at 180° C. in air atmosphere for 1 hr. The thus obtained sample electrodes were submitted to potential measurements under the same conditions as in example 1. The results are listed in Table 2.

TABLE 2

| Electrode No. | No. of paint applications | Loading Ag/Pt (mg/cm$^2$) | E (mV) 4 kA/m$^2$ | E (mV) 6 kA/m$^2$ |
|---|---|---|---|---|
| 7 | 1 | 88/0.095 | −154 | −216 |
| 8 | 2 | 96/0.095 | −171 | −237 |
| 9 | 5 | 91/0.12 | −135 | −210 |
| 10 | 3 | 92/0.012 | −105 | −175 |

Note:
1) paint application indicates the number of applications + heat treatments
2) E(mV) gives the cathodic potential measured under the same conditions as in Example 1.

The thus obtained electrode samples resulted in fairly low potential and had very stable hydrophobic/hydrophilic properties.

EXAMPLE 3

Electrode samples with diffusion layers were prepared under the same conditions as electrode 1. The pastes containing electrode materials of Ag and Pd; or Ag and perovskite were applied on the surface of the diffusion layer at the opposite side of the mesh (current collector). The loading amount of the electrode materials was varied.

The preparation of Ag/Pt (electrode No. 11) and Ag/Pd (electrode No. 12) were done by application of the paste on the above said diffusion layer surfaces followed by drying at 150° C. and heating at 300° C. in $N_2$ flow. The thus obtained electrodes were submitted to the potential measurements under the same conditions as in Example 1 and are listed in Table 3.

TABLE 3

| Electrode No. | Type of electrode[2] | Loading Ag/Pd (mg/cm$^2$) | Loading Ag/P[1] (mg/cm$^2$) | E (mV) 4 kA/m$^2$ | E (mV) 6 kA/m$^2$ |
|---|---|---|---|---|---|
| 11 | Ag/Pt-0.5 | | | −224 | −282 |
| 12 | Ag/Pt-0.45 | | | −182 | −238 |
| 13 | Ag/Pd | 94/0.49 | | −108 | −215 |
| 14 | Ag/P | | 74/11.4 | −164 | −238 |
| 15 | Ag/P-0.45 | | 69/12 | −176 | −242 |
| 16 | Ag/P-0.50 | | 71/14 | −186 | −263 |
| 17 | Ag/P-0.45 | | 54/13.8 | −181 | −248 |
| 18 | Ag/P-0.50 | | 56/14.3 | −196 | −278 |
| 19 | Ag/P | | 49/16.9 | −109 | −168 |

Note:
[1] P means Perovskite La$_{0.1}$Ca$_{0.9}$MnO$_3$
[2] Type of electrode shows the composition of reaction layer in wt %.

EXAMPLE 4

Diffusion and reaction layers were prepared under the same conditions as in Example 1. The diffusion layer composition was composed of 75% by weight of white silver powder having a particle size of 1 to 50 μm, 15% by weight of ammonium acetate as sacrificial material, and 10% by weight of PTFE fine powder. The diffusion layer precursor was prepared under the same process as in Example 1 (the precursor sheet thickness being 1 mm). Silver expanded mesh was prepared from 0.2 mm thick Ag foil. The mesh size of Lw×Sw×St was 4×2×0.4 mm. The apparent thickness was 0.4 mm. This Ag mesh was piled up with the above prepared diffusion layer precursor sheet and hot pressed at 110° C. and at a pressure of 500 kg/cm$^2$ for 30 min. A 0.9 mm thick diffusion layer was obtained. Subsequently, Ag paste containing 80% by weight of 0.01 to 0.5 μm-sized Ag particles and 20% by weight of ammonium citrate (sacrificial material) and 5% by weight of PTFE were applied on the surface of the diffusion layer. Subsequently, after drying, the painted diffusion layer was heat treated at 200° C. for 15 min.

Thus, two kinds of electrodes were obtained, electrode No. 20 having the reaction layer on the opposite side of the expanded mesh and No. 21 having the reaction layer on the same side as the mesh. Potential measurements were performed under the same conditions as in Example 1. The measured potentials at 6 kA/m$^2$ were −238 mV (No. 20) and −229 mV (No. 21) respectively. Basically no difference between these two electrodes was found.

EXAMPLE 5

100×100 mm-sized electrode samples obtained in Example 4 were submitted to a small experimental electrolysis cell having two compartment separated by a cation exchange membrane (Nafion 961). At the anode side, a metal mesh electrode with Ir/Ru/Ti-oxide coating (DSA) with intimate contact with the membrane surface was arranged. Electrodes No. 20 and 21 were attached as cathodes with intimate contact with the membrane via a 0.2 mm thick carbon cloth. A NaOH draining was attached to the bottom of the cathode compartment and $O_2$ gas supply and outlet were also arranged in the cathode compartment. NaCl solution was circulated at the anode compartment and the evolved $Cl_2$ gas was removed at the outside of the anode compartment. The thus obtained configuration of the electrolytic cell is a model of the two compartment type gas diffusion electrode cell or the retrofitting of the existing electrolytic cells. Electrolysis tests were performed with operating conditions according to the below:
  Anolyte: 200 g/l NaCl, pH=2.0
  Catholyte: 350 g/l NaOH
  Temperature: 85° C.
  Current Density: 4 kA/m$^2$ and 6 kA/m$^2$
  Cell voltage:
    Electrode No. 20 1.98V (4 kA/m$^2$), 2.22V (6 kA/m$^2$)
    Electrode No. 21 1.99V (4 kA/m$^2$), 2.22V (6 kA/m$^2$)

The obtained results showed no difference between the two samples and the saving of the cell voltage was almost 1 V compared to the conventional $H_2$ generating electrolysis cell.

EXAMPLE 6

An electrode sample was prepared under the same conditions as in example 1. The composition of the diffusion layer was composed of 70% by weight of silver, 10% by weight of $(NH_4)_2CO_3$ (ammonium carbonate) and 20% by weight of PTFE. A silver sheet precursor was formed under the same conditions as Example 1 by rolling. A precursor of reaction layer is formed from 80% by weight of silver powder with a 0.0005 to 0.5 μm or 0.005 to 0.5 μm particle size, 15% by weight of $(NH_4)_2CO_3$ (ammonium carbonate) and 5% by weight PTFE fine powder. The powder was suspended in D70 solvent. After sufficient mixing by means of a colloidal mixer, the powder was then filtrated with 0.5 μm membrane filter. After preparing a silver-containing gum, it was rolled to a thin sheet of 0.2 mm. Piling up this sheet with a diffusion layer precursor (0.6 mm thick), it was rolled again with a pressurized roll to make one sheet. The thus formed sheet was heated at 180° C. for 30 min. The thus formed gas diffusion electrode sample was obtained with a total thickness of 0.7 mm. Although this electrode had no current collector, the electric resistance was low and worked well as a current collector. The electrode was submitted to the same electrolysis cell as in Example 5. The electrolysis conditions were also the same as in Example 5. The cell voltage was 1.89 V at 4 kA/m$^2$ and 2.06 V at 6 kA/m$^2$. Good electrolysis results could be obtained even in the absence of a current collector on the electrode.

EXAMPLE 7

Diffusion and reaction layers were prepared under the same conditions as in Example 1 with the diffusion layer composition composed of 70% by weight of white silver powder having a particle size of 1 to 50 μm, 10% by weight of ammonium acetate as sacrificial material, and 20% by weight of PTFE fine powder. The diffusion layer precursor was prepared as in Example 1 (the precursor sheet thickness being 1 mm). Ag paste containing 80% by weight of 0.01 to 0.5 μm-sized Ag particles and 15% by weight of ammonium citrate (sacrificial material) and 5% by weight of PTFE as the reaction layer were applied on the surface of the diffusion layer. The sheets were piled up and hot pressed at 110° C. and at a pressure of 500 kg/cm$^2$ for 30 min. Subsequently, a hot pressed layer was heat treated at 200° C. for 15 min whereby an electrode was obtained.

The porosity includes both open pores and non-open pores. A reference sample was prepared in the same way without sacrificial material, containing 80% by weight of silver powder having a particle size of 1 to 50 ρm and 20% by weight of PTFE in the diffusion layer and 95% by weight of 0.01 to 0.5 μm-sized Ag particles in the reaction layer. The porosity (the apparent density/the theoretical density was calculated by measuring the apparent volume and weight and by comparing the apparent density with reference values of the density (theoretical density). Potential measurements were done as in example 1. The porosity of the electrode according to the invention was 75 to 80%. The porosity of the reference sample was 50 to 55%. The difference was caused by the elimination of sacrificial materials. The obtained potential was −290 mV at 6 kA/m$^2$ for the electrode according to the invention, and −400 mV at 6 kA/m$^2$ for the reference electrode. These electrochemical measurements were performed at an oxygen gas pressure of 1.2 atm. When the pressure was 1.05 atm, the same result of −295 mV was obtained for the electrode according to the invention at 6 kA/m$^2$ but for the reference electrode, the potential could not be measured, probably due to too high pressure drop in the diffusion layer. From the above, one can conclude the electrode of the invention has a proper pore size and a proper number of open pores resulting in a reduced potential.

The invention claimed is:

1. A method of preparing a gas diffusion electrode comprising a porous diffusion layer and a porous reaction layer attached to each other, wherein the porous diffusion layer is prepared by
  i) admixing a) sacrificial material, b) fluoropolymer and c) a metal-based material, wherein the sacrificial material has a release temperature below 275° C. and is added in an amount from 1 to 25 wt % based on the total weight of a)-c) admixed;
  ii) forming a diffusion layer from the admixture of step i); and
  iii) heating the forming diffusion layer to a temperature lower than 275° C. so as to release at least a part of said sacrificial material from the diffusion layer, such that the diffusion layer after release of the sacrificial material has a porosity ranging from 60 to 95%.

2. The method according to claim 1, wherein the diffusion and reaction layers are co-pressed.

3. The method according to claim 1, wherein the gas diffusion electrode comprises a substrate.

4. The method according to claim 3, wherein the diffusion layer is heated to a temperature of at least 100° C.

5. The method according to claim 1, wherein the diffusion layer is heated to a temperature of at least 150° C.

6. A gas diffusion electrode obtainable by the method according to claim 1.

7. The gas diffusion electrode according to claim 6, wherein the porosity of the diffusion layer ranges from 65 to 85%.

8. The gas diffusion electrode according to claim 6, wherein the electrode further comprises a substrate.

9. The gas diffusion electrode according to claim 6, wherein the diffusion layer has pores ranging from 10 to 400 μm.

10. The gas diffusion electrode according to claim 6, wherein the electrode comprises a hydrophilic layer.

11. The gas diffusion electrode according to claim 6, wherein a current collector is arranged to the electrode.

12. An electrolytic cell comprising a separator dividing the cell into an anode and a cathode compartment, wherein the electrode according to claim 6 is arranged in the cathode compartment.

13. A fuel cell comprising the gas diffusion electrode according to claim 6.

14. A metal-air battery comprising the gas diffusion electrode according to claim 6.

15. A gas diffusion electrode comprising a porous diffusion layer and a porous reaction layer attached to one another, wherein the diffusion layer has a porosity ranging from 60 to 95%, and wherein the density of the diffusion layer ranges from 2 to 7 g/cm$^3$ and the weight ratio of polymer to metal ranges from 5:100 to 40:100.

16. The gas diffusion electrode according to claim 15, wherein the diffusion layer has pores ranging from 10 to 400 μm.

17. The gas diffusion electrode according to claim 15, wherein the electrode comprises a hydrophilic layer.

18. An electrolytic cell comprising a separator dividing the cell into an anode and a cathode compartment, wherein the electrode according to claim 15 is arranged in the cathode compartment.

19. A fuel cell comprising the gas diffusion electrode according to claim 15.

20. A metal-air battery comprising the gas diffusion electrode according to claim 15.

* * * * *